UNITED STATES PATENT OFFICE 2,023,863

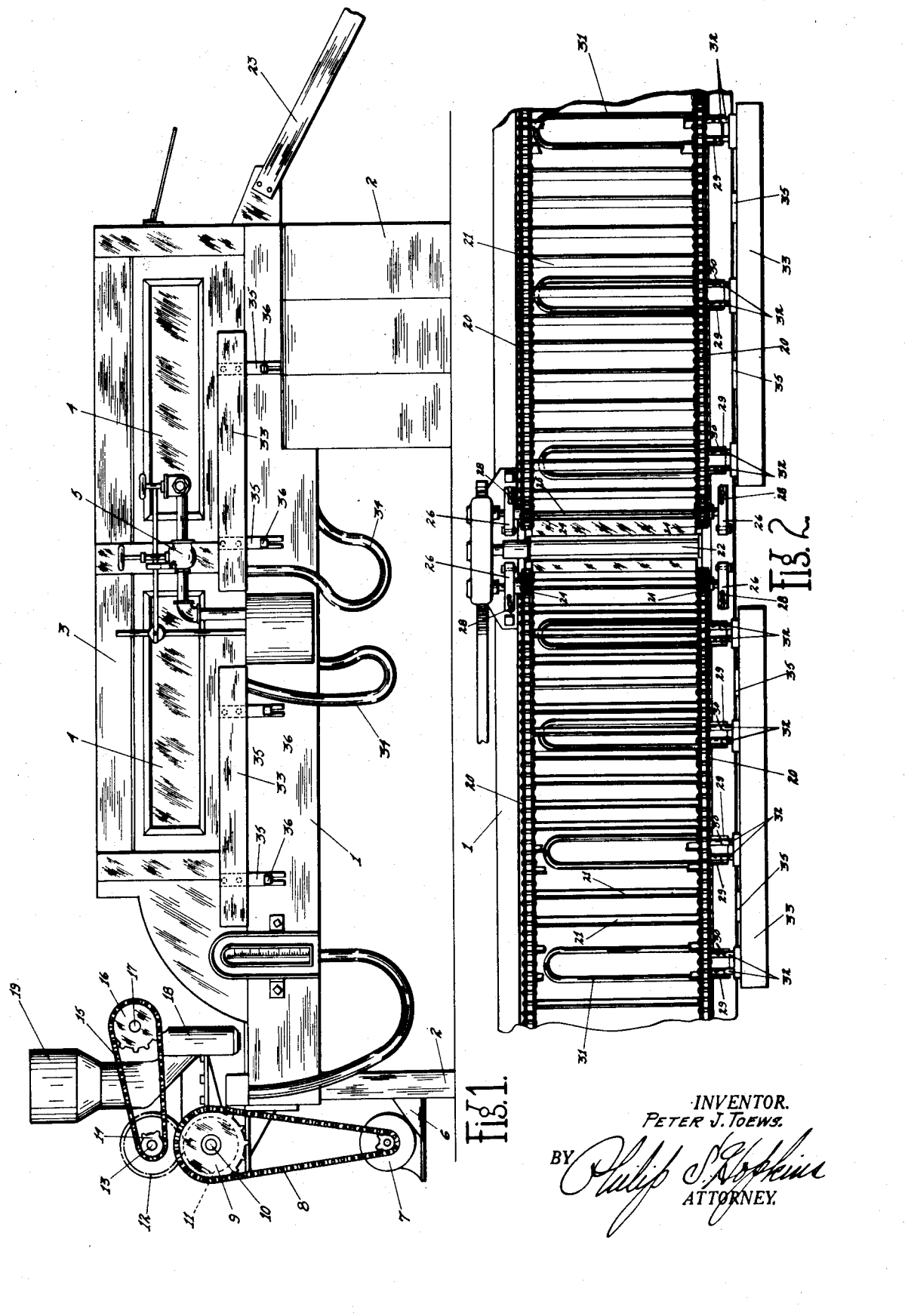

HEATING APPARATUS FOR DOUGHNUT MACHINES AND THE LIKE

Peter J. Toews, Minneapolis, Minn.

Application January 21, 1932, Serial No. 587,913

11 Claims. (Cl. 219—19)

My invention relates to heating apparatus for doughnut machines and the like, and has for its primary object the provision of a novel heating unit for the cooking vats of doughnut machines.

More particularly it is the principal object of my invention to provide electrical heating units for the cooking grease in doughnut machines which units are suitably supported within the vats without interference to the conveyors operating therein and which are readily removable in order that the vats may be easily cleaned when desired.

Another object of my invention lies in the provision of a novel supporting means for the heating units to facilitate their ready removal.

Still another object lies in the provision of means for removably supporting the shafts carrying the driving mechanism for the conveyor units whereby ready access may be had to the vats for cleaning.

A further object lies in the novel arrangement of the heating units within the vats whereby to eliminate the possibility of leakage of the cooking grease and any interference between the heating elements and the conveyors.

Other objects and advantages in details of construction will be apparent as the description proceeds, reference now being had to the figures of the accompanying drawings forming a part of this application and wherein like reference numerals indicate like parts.

In the drawings:

Figure 1 is a side view of a doughnut machine equipped with my invention.

Figure 2 is a partial top plan view illustrating the heating units and the conveyors within the cooking vats.

Figure 3:
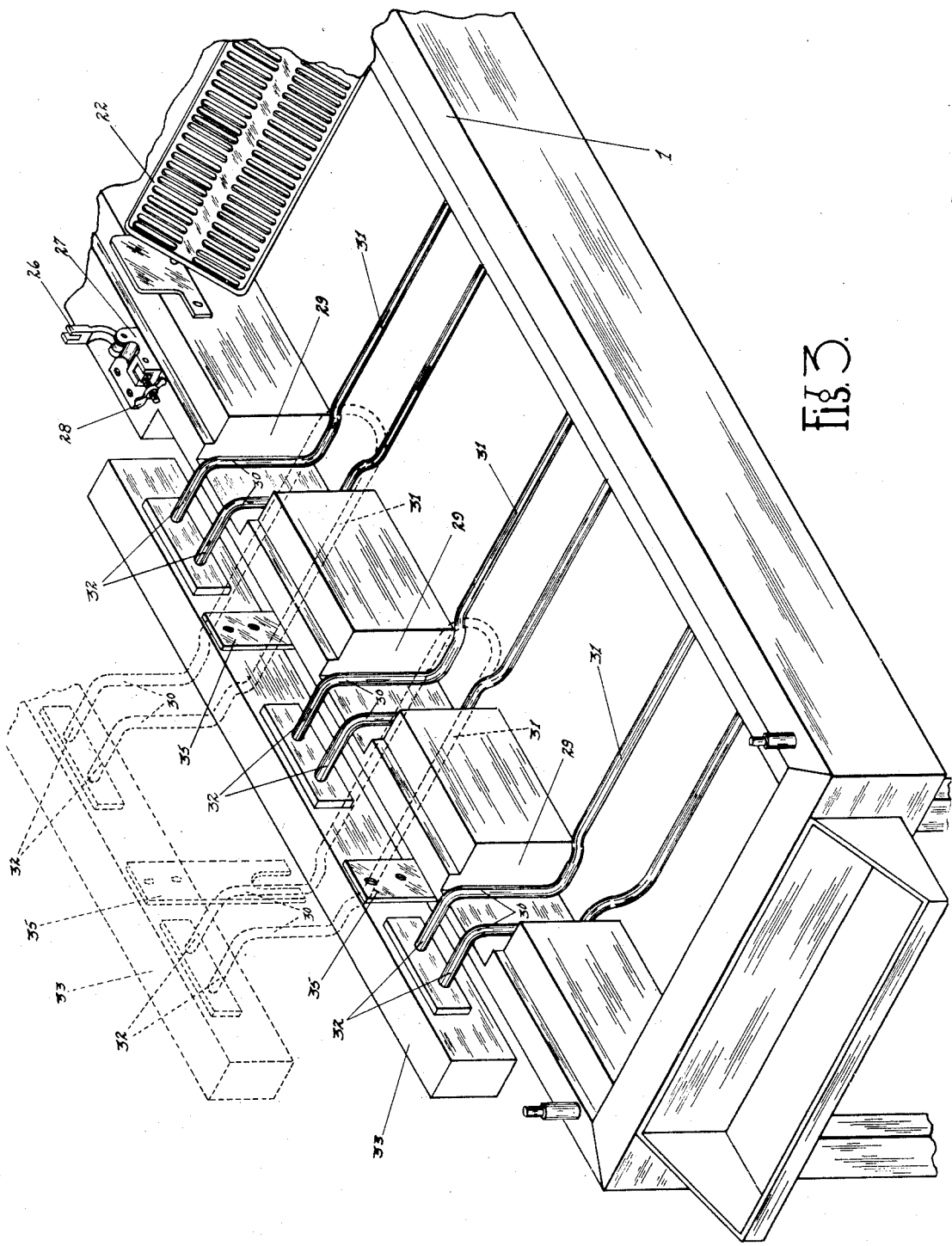
Figure 3 is an enlarged detail perspective of one of the cooking vat sections illustrating the mounting of the heating units within the vat, the conveyors being removed for clearness of illustration.

The reference character 1 indicates generally the cooking vat of a doughnut machine, suitably supported upon legs 2. The hood or top frame structure is indicated at 3 and is provided with windows 4 through which may be viewed the progress of the dough rings as they are cooked. 5 indicates generally a float controlled valve by means of which the level of the cooking grease is automatically maintained within the vat.

Adjacent the front end of the machine the legs 2 are provided with a bracket 6 supporting a motor 7 which drives by means of an endless chain 8, a sprocket 9 on a shaft 10 on which shaft is mounted a gear 11 meshing with a gear 12 on a shaft 13 provided with a sprocket 14 which drives by means of the endless chain 15, a sprocket 16 on the shaft 17. Suitable actuating means (not shown) are provided and operated by the rotation of the shaft 17 to actuate cutters 18 which periodically extrude the dough rings, dropping them into the cooking vat in position to be moved therein by means of the conveyor devices to be described. The hopper or supply tank 19 provides the source of dough for the cutters 18.

All of these features above described may be conventional in form and have not been illustrated or described in detail as they form no part of this invention.

Positioned within the vat 1 are two conveyors 15 disposed in longitudinal alignment and spaced slightly apart, substantially centrally of the vat. Each of these conveyors comprises a pair of endless chains 20 secured to which and extending between which are the paddles or conveyor blades 20 21 adapted to engage the dough rings within the vat and as the chains are moved, to move such dough rings longitudinally through the vat as they are cooked. Positioned in the space between the conveyors is a turning paddle 22 which periodically rotates and picks up the dough rings fed adjacent thereto by the front conveyor, and upon rotation of the paddle 22 reverses the dough rings and disposes them on the opposite side in position to be moved by the next conveyor to the end of the machine where they are discharged, fully cooked, into the chute 23.

The endless chains 20 pass around suitable sprockets 24 mounted on shafts 25 extending across the vat 1, the ends of such shafts 25 being removably supported in split bearings 26 disposed on the upper edges of the sides of the vat 1. These split bearings 26 are shown in detail in Figure 3 and comprise the pivoted portion 26 and the fixed portion 27 cooperating to rotatably receive the ends of the shafts 25. A locking screw 28 is provided whereby to secure the parts of the bearings in supporting relation to the ends of the shafts.

The use of this type of bearing permits ready removal of the conveyors comprising the chains 20 and paddles 21 from the vat 1 whereby the interior of the vat may be reached for cleaning.

It will be noted particularly with reference to Figures 2 and 3 that one side wall of the vat 1 is provided with spaced recesses 29. These recesses are adapted to receive the ends 30 of the heating units 31, which units are adapted to lie substantially flat in the bottom of the vat 1 when in heating position, and the opposite ends thereof being bent outwardly and over the edge of the vat 1 as at 32 where such ends pass into a box 33 where the electrical connections are made with a source of electrical energy as through the cables 34 extending from any suitable source to the boxes 33. It will be noted that by virtue of the recesses 29 and the vertical portions 30 of the heating units lying therein, such heating units do not interfere with the adjacent lengths of the endless chains 20 of the conveyors which are disposed within the vats just inside the side walls thereof.

The boxes 33 are removably supported on the side of the vat 1 by means of bifurcated supporting lugs 35 carried by the boxes and adapted to engage with headed bolts 36 provided on the outside of the vat 1. It will be obvious that by merely lifting upwardly on the boxes 33, as indicated in dotted lines in Figure 3, the boxes are raised from the supporting bolts 36 and the heating units 31 are raised therewith and may be thus readily removed from the vat 1 in order that it may be thoroughly cleaned without interference with the heating units. It will be obvious, of course, that the conveyors will have been first removed from the vat by lifting the shafts 25 out of the split bearings 26 in the manner heretofore described.

The cables 34 are, of course, of a length sufficient to permit the ready removal of the boxes 33 and the heating units 31.

It will thus be seen that I have provided a heating means for the cooking vat of a doughnut machine which does not interfere with the operation of the conveyors but which is positioned directly within the vat and which may be easily and quickly removed, as can the conveyors, by virtue of their removable supports. The heating units, because of their novel support, require no openings to be drilled through the bottom or sides of the vat and thus there is no danger of leakage of the cooking grease therefrom.

In the drawings two separate sections of heating units are shown although it will be understood that one or more can be provided as desired.

Of course, changes may be made in details of construction and arrangement of parts without departing from the spirit and scope of my invention. I do not limit myself, therefore, to the exact form herein shown and described other than by the appended claims.

I claim:

1. In combination, a cooking vat comprising a casing having spaced recesses along a side thereof, electrical heating members extending adjacent said side and downwardly into said recesses then over and adjacent to the bottom of said vat, and supporting means for said members mounted on the outside of said vat.

2. In combination, a cooking vat comprising a casing having spaced recesses along a side thereof, electrical heating members extending adjacent said side and downwardly into said recesses then over and adjacent to the bottom of said vat, and supporting means for said members mounted on the outside of said vat, said supporting means being removably mounted whereby said members may be readily removed from said vat.

3. In combination, a cooking vat comprising a casing having spaced recesses along a side thereof, electrical heating members extending adjacent said side and downwardly into said recesses then over and adjacent to the bottom of said vat, removable supporting means on the outside of said vat for said members, and conveyors in said vat extending along the sides thereof and across said recesses.

4. In combination, a cooking vat comprising a casing having spaced recesses along a side thereof, electrical heating members extending adjacent said side and downwardly into said recesses then over and adjacent to the bottom of said vat, removable supporting means on the outside of said vat for said members, and conveyors in said vat extending along the sides thereof and across said recesses, said conveyors being readily removable to permit the removal of said heating members.

5. In combination, a cooking vat comprising a casing having spaced recesses along a side thereof, electrical heating members extending adjacent said side and downwardly into said recesses then over and adjacent to the bottom of said vat, and a box supporting member removably mounted on the outside of said vat, the ends of said heating members extending outwardly from said vat being secured thereto whereby a plurality of said heating members are removably supported as a unit.

6. In combination, a cooking vat comprising a casing having spaced recesses along a side thereof, electrical heating members extending adjacent said side and downwardly into said recesses then over and adjacent to the bottom of said vat, and a box supporting member removably mounted on the outside of said vat, the ends of said heating members extending outwardly from said vat being secured thereto whereby a plurality of said heating members are removably supported as a unit, said box having bifurcated lugs thereon for engagement with headed bolts on said vat.

7. In combination, a cooking vat comprising a casing having spaced recesses along a side thereof, electrical heating members extending adjacent said side and downwardly into said recesses then over and adjacent to the bottom of said vat, and a box supporting member removably mounted on the outside of said vat, the ends of said heating members extending outwardly from said vat being secured thereto whereby a plurality of said heating members are removably supported as a unit, and conveyors in said vat comprising endless chains extending along the sides of said vat, sprocket shafts for said chains and split hinged bearings on the sides of said vat for said shafts whereby said conveyors are removable from said vat.

8. In combination, a cooking vat comprising a casing having a bottom and a wall extending upwardly therefrom, an electrical heating member having a part overlying the bottom of the casing and a part extending upwardly along said wall, a conveyor for conducting doughnuts along said vat and past the part of said heating element extending along said wall, and means at said wall forming a duct in which the last named part of the heating member is disposed and by means of which the doughnuts are kept away from said part of the heating element.

9. In combination, a cooking vat comprising a casing, an electrical heating member having a part extending along the bottom of the casing and another part extending along one side and out of the casing, a support disposed externally of said casing, supporting members on said support and the second named part of said heating member for holding said heating member in position within said casing, one of said supporting members having a guide and the other having means movable along said guide for guiding said heating member for vertical movement.

10. In a doughnut machine, a cooking vat comprising an elongated casing having a bottom and side walls extending upwardly therefrom, a conveyor extending along said casing between said side walls and disposed above said bottom and spaced from one side wall for conveying doughnuts along said vat, a number of heating members wtihin said casing situated at spaced intervals along the same, said heating members having parts disposed between said bottom and conveyor and having other parts disposed adjacent said above referred to side wall and between it and said conveyor, and guide means at the upper part of said wall between the last named parts of consecutive heating members, said guide means having lateral surfaces following along one lateral edge of the conveyor, said surfaces in proximity to said heating elements being positioned closely to said conveyor and inwardly of said last named parts of the heating elements to direct doughnuts carried by the conveyor away from said parts of the heating elements.

11. In a doughnut machine, a cooking vat comprising an elongated casing having a bottom and side walls extending upwardly therefrom, a conveyor extending along said casing between said side walls and disposed above said bottom and spaced from one side wall for conveying doughnuts along said vat, a heating member within said vat having a part disposed between said bottom and conveyor and another part extending upwardly adjacent said side wall and between it and said conveyor, and guide means on the upper part of said wall extending along said conveyor on the advance side of said heating element, and having a lateral surface disposed at the elevation of the doughnuts, said surface in proximity to said heating element being positioned inwardly of the last named part of the heating element to direct doughnuts carried by the conveyor away from said part of the heating element.

PETER J. TOEWS.